US010120263B2

(12) United States Patent
Jarrahi

(10) Patent No.: US 10,120,263 B2
(45) Date of Patent: Nov. 6, 2018

(54) LOW-DUTY-CYCLE CONTINUOUS-WAVE PHOTOCONDUCTIVE TERAHERTZ IMAGING AND SPECTROSCOPY SYSTEMS

(71) Applicant: The Regents of the University of California, Oakland, CA (US)

(72) Inventor: Mona Jarrahi, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/318,347

(22) PCT Filed: Jun. 12, 2015

(86) PCT No.: PCT/US2015/035685
§ 371 (c)(1),
(2) Date: Dec. 12, 2016

(87) PCT Pub. No.: WO2015/192094
PCT Pub. Date: Dec. 17, 2015

(65) Prior Publication Data
US 2017/0123292 A1    May 4, 2017

Related U.S. Application Data

(60) Provisional application No. 62/011,848, filed on Jun. 13, 2014.

(51) Int. Cl.
*G02F 1/35* (2006.01)
*G02F 2/02* (2006.01)

(52) U.S. Cl.
CPC ........ *G02F 1/3534* (2013.01); *G02F 2203/13* (2013.01)

(58) Field of Classification Search
None
See application file for complete search history.

(56) References Cited

U.S. PATENT DOCUMENTS 7,515,801 B2 * 4/2009 McCaughan ......... G02F 1/3534
                                                    385/122
7,599,409 B2 * 10/2009 Nishizawa ............ G02F 1/3534
                                                    372/20

(Continued)

FOREIGN PATENT DOCUMENTS

EP        3155702 A1    4/2017
JP     2017523601 A     8/2017
(Continued)

OTHER PUBLICATIONS

International Search Report and Written Opinion for International Application PCT/US2015/035685, Report Completed Aug. 27, 2015, dated Aug. 27, 2015, 8 Pgs.

(Continued)

*Primary Examiner* — Rhonda S Peace
(74) *Attorney, Agent, or Firm* — KPPB LLP

(57) ABSTRACT

Systems and methods for plasmonics enhanced photomixing for generating continuous-wave (CW) frequency-tunable terahertz radiation in accordance with embodiments of the invention are disclosed. A photomixing system configured to generate continuous-wave terahertz frequency signals can include an optical pump configured to generate at least two beams, where the at least two beams are utilized to create a frequency-offset and operate below a 50% duty cycle, where the duty cycle includes an operation cycle and a sleep cycle. The photomixing system can also include a photomixer that includes a radiating element configured to receive the frequency-offset and to generate a terahertz radiation utilizing the received frequency-offset and the radiating element, where the radiating element includes at least one plasmonic contact electrode.

24 Claims, 13 Drawing Sheets

(56) References Cited

U.S. PATENT DOCUMENTS

| | | | | |
|---|---|---|---|---|
| 7,710,637 | B2* | 5/2010 | Ikari | G02F 1/39 359/330 |
| 7,915,641 | B2* | 3/2011 | Otsuji | H01S 1/02 257/10 |
| 8,610,094 | B2* | 12/2013 | Kim | G02F 2/002 250/493.1 |
| 8,649,414 | B2* | 2/2014 | Park | H01S 5/06258 372/108 |
| 8,730,567 | B2* | 5/2014 | Kim | G02F 1/2255 359/239 |
| 2006/0153262 | A1 | 7/2006 | Barbieri et al. | |
| 2011/0074293 | A1 | 3/2011 | Hagmann et al. | |
| 2011/0080329 | A1 | 4/2011 | Nagel | |
| 2011/0149368 | A1* | 6/2011 | Kim | G02F 1/3534 359/276 |
| 2012/0147907 | A1* | 6/2012 | Kim | H01S 5/06258 372/4 |
| 2012/0162747 | A1* | 6/2012 | Kim | G02F 1/2255 359/326 |
| 2013/0015375 | A1 | 1/2013 | Avouris et al. | |
| 2013/0161541 | A1* | 6/2013 | Kim | G02F 2/002 250/504 R |
| 2014/0346357 | A1* | 11/2014 | Jarrahi | H01L 31/09 250/338.4 |
| 2016/0064110 | A1* | 3/2016 | Schmadel | G02F 1/3534 250/504 R |
| 2017/0123292 | A1* | 5/2017 | Jarrahi | G02F 1/3534 |

FOREIGN PATENT DOCUMENTS

| | | |
|---|---|---|
| WO | 2012057710 A1 | 5/2012 |
| WO | 2013112608 A1 | 8/2013 |
| WO | 2015192094 | 12/2015 |

OTHER PUBLICATIONS

Shibuya, Kyoji et al., "Enhancement of THz photomixing efficiency by using a pulse-modulated multimode laser diode.", In: 2007 Joint 32nd International Conference on Infrared and Millimeter Waves and 15th International Conference on Terahertz Electronics. Edited by M.J. Griffin et al. Cardiff: IEEE. pp. 732-733.
Extended European Search Report for European Application No. 15807544.0, Search completed Jun. 12, 2018, and dated Jun. 20, 2018, 8 Pgs.
International Preliminary Report on Patentability for International Application PCT/US2015/035685, Report dated Dec. 15, 2016, dated Dec. 22, 2016, 6 Pgs.
Berry et al., "Design, Fabrication, and Experimental Characterization of Plasmonic Photoconductive Terahertz Emitters", Journal of Visualized Experiments, Jul. 2013, vol. 77, pp. e505171-e505178.
Berry et al., "Generation of high power pulsed terahertz radiation using a plasmonic photoconductive emitter array with logarithmic spiral antennas", Appl. Phys. Lett., 104, 081122, 2014.
Berry et al., "Plasmonically-Enhanced Localization of Light into Photoconductive Antennas", IEEE 2010 Conference on Lasers and Electro-Optics (CLEO) and Quantum Electronics and Laser Science Conference (QELS), Conference Date May 16-21, 2010, San Jose, California, 2 pgs.
Berry et al., "Principles of Impedance Matching in Photoconductive Antennas", J Infrared Milli Terahz Waves, 33, 2012, published online Sep. 27, 2012, pp. 1182-1189.
Berry et al., "Significant performance enhancement in photoconductive terahertz optoelectronics by incorporating plasmonic contact electrodes", Nature Communication, vol. 4, Mar. 27, 2013, 10 pgs.
Berry et al., "Terahertz generation using plasmonic photoconductive gratings", New Journal of Physics, 2012, vol. 14, 12 pgs.
Berry et al., "Ultrafast Photoconductors based on Plasmonic Gratings", IEEE 2011 36th International Conference on Infrared, Millimeter and Terahertz Waves (IRMMW-THz), Conference Date Oct. 2-7, 2011, Houston, Texas, 2 pgs.
Bjarnason et al., "ErAs: GaAs photomixer with two-decade tunability and 12 µW peak output power", Appl. Phys. Lett., vol. 85, No. 18, Nov. 1, 2004, pp. 3983-3985.
Brown et al., "Characterization of a Planar Self-Complementary Square-Spiral Antenna in the THz Region", Microwave and Optical Technology Letters, vol. 48, No. 3, Mar 2006, pp. 524-529.
Brown et al., "Coherent millimeter-wave generation by heterodyne conversion in low-temperature-grown GaAs photoconductors", Journal of Applied Physics, Feb. 1, 1993, vol. 3, pp. 1480-1484.
Catrysse et al., "Guided modes supported by plasmonic films with a periodic arrangement of subwavelength slits", Applied Physics Letters, 2006, vol. 88, pp. 031101-1-031101-3.
Chimot et al., "Photomixing at 1.55 µm in ion-irradiated In0.53GA. 47As on InP", Optics Express, Mar. 6, 2006, vol. 14, No. 4, 6 pgs.
Gregory et al., "Optimization of Photomixers and Antennas for Continuous-Wave Terahertz Emission", IEEE Journal of Quantum Electronics, vol. 41, No. 5, May 2005, pp. 717-728.
Heshmat et al., "Nanoplasmonic Terahertz Photoconductive Switch on GaAs", American Chemical Society, Nano Letters, published Nov. 21, 2012.
Hsieh et al., "Analysis of periodic metallic nano-slits for efficient interaction of terahertz and optical waves at nano-scale dimensions", Journal of Applied Physics, 2011, vol. 109, pp. 084326-1-084326-5.
Huo et al., "Planar Log-Periodic Antennas on Extended Hemispherical Silicon Lenses for Millimeter/Submillimeter Wave Detection Applications", International Journal of Infrared and Millimeter Waves, vol. 23, No. 6, Jun. 2002, pp. 819839.
Liu et al., "Coherent Detection of Multiband Terahertz Radiation Using a Surface Plasmon-Polariton Based Photoconductive Antenna", IEEE Transactions on Terahertz Science and Technology, vol. 1, No. 2, Nov. 2011, Manuscript published Oct. 10, 2011, pp. 412-415.
Loata et al., "Radiation field screening in photoconductive antennae studied via pulse terahertz emission spectroscopy", Appl. Phys. Lett. 91, 232506, 2007, pp. 232506-1-232506-3.
Mangen Ey et al., "Continuous wave terahertz generation up to 2 THz by photomixing on ion-irradiated in0.53GA0.47As at 1.55 pm wavelengths", Applied Physics Letters, vol. 91, 2007, pp. 241102-1-241102-3,.
Michael et al., "Large-area traveling-wave photonic mixers for increased continuous terahertz power", Appl. Phys. Letter 86, 111120, 2005.
Middendorf et al., "THz generation using extrinsic photoconductivity at 1550 nm", Optics Express, Jul. 16 2012, vol. 20, No. 15, pp. 16504-16509.
Park et al., "Enhancement of Terahertz Pulse Emission by Optical Nanoantenna", American Chemical Society, ACS Nano, No. 6, No. 3, 2012, published online Feb. 17, 2012, pp. 2026-2031.
Park et al., "Terahertz photoconductive antenna with meal nanoislands", Optics Express, Nov. 5, 2012, vol. 20, No. 23, 6 pgs.
Peytavit et al., "Continuous terahertz-wave generation using a monolithically integrated horn antenna", Applied Physics Letters, 2008, vol. 93, pp. 111108-1-111108-3.
Peytavit et al., "Milliwatt-level output power in the sub-terahertz range generated by photomixing in a GaAs photoconductor", Appl. Phys. Lett., 99, 223508, 2011.
Preu et al., "Tunable, continuous-wave Terahertz photomixer sources and applications", Journal of Applied Physics, 2011, vol. 109, pp. 016301-1-061301-56.
Roehle et al., "Next generation 1.5 µm terahertz antennas: mesa-structuring of InGaAs/InAlAs photoconductive layers", Optics Express, vol. 18, No. 3, Feb. 1, 2010, pp. 2296-2301.
Shen et al., "Properties of a one-dimensional metallophotonic crystal", Physical Review, 2004, vol. B70, pp. 035101-1-038101-8.
Sukhotin et al., "Photomixing and photoconductor measurements on ErAs/InGaAs at 1.55 µm", Appl. Phys. Lett., vol. 82, No. 18, May 5, 2003, pp. 3116-3118.
Suzuki et al., "Fe-implanted InGaAs terahertz emitters for 1.56 µm wavelength excitation", Appl. Phys. Lett. 86, 051104, 2005.

(56) References Cited

OTHER PUBLICATIONS

Takazato et al., "Detection of terahertz waves using low-temperature-grown InGaAs with 1.56 μm pulse excitation", Appl. Phys. Lett. 90, 101119, 2007.
Taylor et al., "Resonant-optical-cavity photoconductive switch with 0.5% conversion efficiency and 1.0 W peak power", Optics Letters, vol. 31, No. 11, Jun. 1, 2006, pp. 1729-1731.
Wang et al., "Plasmonic photoconductive detectors for enhanced terahertz detection sensitivity", Optical Society of America, Opt. Express, vol. 21, No. 14, Jul. 15, 2013, pp. 17221-7.
Yang et al., "Enhanced light-matter interaction at nanoscale by utilizing high-aspect-ratio metallic gratings", Optics Letters, vol. 38, No. 18, Sep. 15, 2013, pp. 3677-3679.

\* cited by examiner

1

LOW-DUTY-CYCLE CONTINUOUS-WAVE PHOTOCONDUCTIVE TERAHERTZ IMAGING AND SPECTROSCOPY SYSTEMS

CROSS REFERENCE TO RELATED APPLICATIONS

This application is a national stage of PCT Patent Application No. PCT/US2015/035685, entitled "Low-Duty-Cycle Continuous-Wave Photoconductive Terahertz Imaging and Spectroscopy Systems" to Mona Jarrahi, filed Jun. 12, 2015, which application claims priority to U.S. Provisional Application No. 62/011,848, entitled "Low-Duty-Cycle Continuous-Wave Photoconductive Terahertz Imaging and Spectroscopy Systems" to Mona Jarrahi, filed Jun. 13, 2014, the disclosures of which are incorporated herein by reference in their entirety.

STATEMENT OF FEDERAL RIGHTS

This invention was made with Government support under W911NF-12-1-0253, awarded by the U.S. Army, Army Research Office, N00014-12-1-0947, awarded by the U.S. Navy, Office of Naval Research and 1054454, 1305931, awarded by the National Science Foundation. The Government has certain rights in the invention.

FIELD OF THE INVENTION

The present invention generally relates to photomixing and more specifically to systems and methods for utilizing low-duty-cycles for various photomixers.

BACKGROUND

Photomixing can involve pumping a high-speed photoconductor that is integrated with a radiating element with two frequency-offset pump lasers. Typically, the beams from the pump lasers are mixed together and focused onto a photomixer device (i.e. photoconductive source and/or detector) which generates the terahertz radiation. The frequency offset of the two pump lasers and, thus, the frequency of generated photocurrent and radiation, can be set to a desired frequency. Technological breakthroughs in fiber optic communications and the availability of high power, widely tunable, narrow linewidth and compact fiber lasers and amplifiers have made telecommunication wavelengths a useful wavelength for pumping photomixers.

DETAILED DESCRIPTION OF THE DRAWINGS

Figure 1:
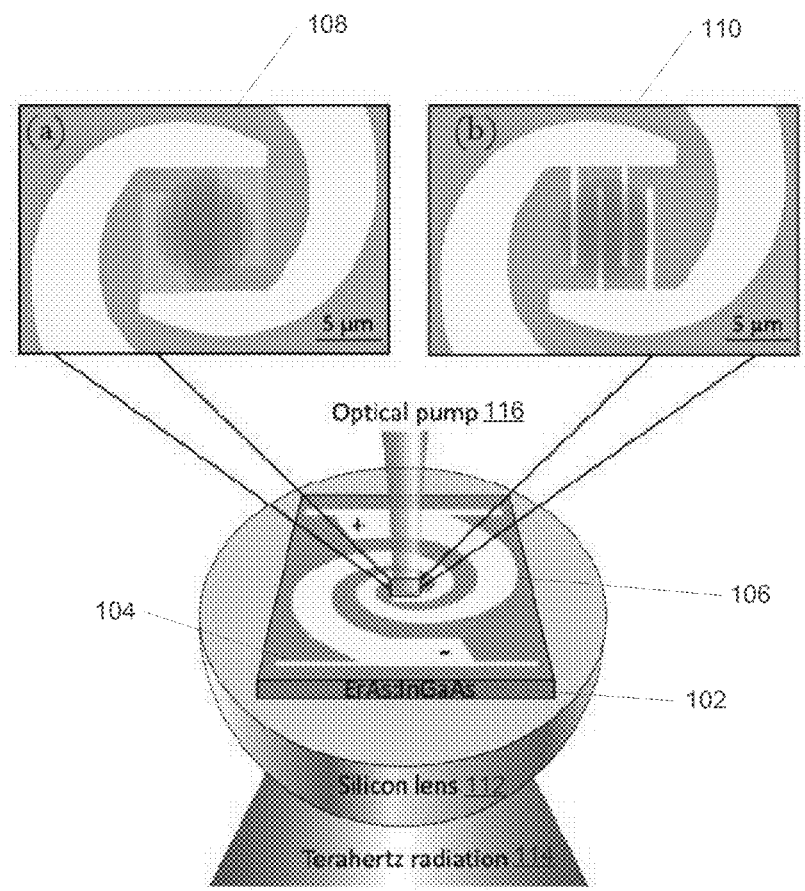
FIG. 1 is a schematic diagram of a plasmonic photomixer in comparison with a photomixer having interdigitated contact electrodes (i.e. conventional photomixer) in accordance with an embodiment of the invention.

Turning now to the drawings, systems and methods for plasmonics enhanced photomixing for generating continuous-wave (CW) frequency-tunable terahertz radiation in accordance with embodiments of the invention are disclosed. In many embodiments, a plasmonic photomixer with plasmonic contact electrode gratings allow efficient optical transmission through subwavelength metallic gratings into photo-absorbing active regions by excitation of surface plasmon waves (i.e. coherent electron oscillations that exist at the interface between two materials where the real part of the dielectric function changes sign across the interface) along the periodic metallic grating interface. Various plasmonic photomixers can be utilized in accordance with embodiments of the invention including (but not limited to) those described in U.S. Patent Application No. 61/589,486, filed Jan. 23, 2013, titled "Photoconductive Device with Plasmonic Electrodes", the contents of which are incorporated by reference in their entirety herein. In several embodiments, the plasmonic photomixer utilizes the improved device quantum efficiency enabled by the enhanced photo-carrier concentration near the plasmonic contact electrodes. The implementation and impact of plasmonic contact electrodes in enhancing the photomixer efficiency can be universally implemented and further utilized in a variety of photomixer architectures. In this regard, higher photomixer efficiencies can be achieved by using high aspect-ratio plasmonic contact electrodes and optical pump resonance cavities, as well as improved impedance matching and antenna performances.

In many embodiments, a plasmonic photomixer with plasmonic contact electrode gratings can be fabricated on any substrate that can absorb photons in an optical pump's operating wavelength ranges including (but not limited to)

ErAs:InGaAs, ErAs compound, InGaAs compound, GaAs, InGaAs, Ge, InP, graphene, and GaN substrates. In various embodiments, optical pumps can operate in the 700 to 1550 nm wavelengths. In several embodiments, at an average optical pump power of 100 mW, the plasmonic photomixer offers an order of magnitude higher terahertz power levels compared to an analogous conventional photomixer having interdigitated contact electrodes in the 0.25-2.5 THz frequency range.

In many embodiments, photomixers in accordance with embodiments of the invention can utilize pump duty cycles below 50% to push the thermal breakdown onset to higher optical pump powers and achieve higher terahertz radiation powers. Typically, photoconductive terahertz sources and detectors in CW terahertz imaging and spectroscopy systems are pumped by a combination of two heterodyned CW optical pump beams with a terahertz frequency difference. The ultimate failure point of such devices is the thermal breakdown at high optical pump powers. However, in the absence of the thermal breakdown limit, higher radiation powers and detection sensitivities can be offered by photoconductive terahertz sources and detectors, respectively.

Photomixing systems and methods in accordance with embodiments of the invention address the thermal breakdown limitations of photoconductive terahertz sources and detectors and can offer improved device performances. In several embodiments, a low-duty-cycle optical pump is utilized where the terahertz imaging and spectroscopy systems operate in certain operation cycles followed by a sleep cycle, determined by the duty cycle of the optical pump. In many embodiments, during the operation cycle, the terahertz source and detector are pumped and the generated and detected terahertz waves used to produce the output image and spectra of the terahertz imaging and spectroscopy system. During the sleeping cycle, the terahertz source and detector are not pumped, letting the device cool down while not producing any output data. The use of a low-duty-cycle optical pump can allow increasing the optical pump power at each operation cycle while maintaining a low average optical pump power. Therefore, high radiation powers and detection sensitivities can be achieved within each operation cycle without device failure due to thermal breakdown, and higher quality image and spectra data can be produced through the system. For example, at an average optical pump power of 150 mW with a pump modulation frequency of 1 MHz and pump duty cycle of 2%, the plasmonic photomixer demonstrates up to 0.8 mW radiation power at 1 THz within each CW radiation cycle. In certain embodiments, the enhanced terahertz radiation powers offered by plasmonic photomixer in accordance with embodiments of the invention can be utilized for terahertz imaging and spectroscopy systems. Plasmonic photomixers in accordance with embodiments of the invention are further discussed below.

Plasmonic Nanostructures

Utilizing plasmonic nanostructures can be effective in enhancing the quantum efficiency of photoconductive terahertz optoelectronics. In particular, plasmonic nanostructures can be capable of manipulating the intensity of an incident optical pump beam and focusing it tightly next to the device contact electrodes. By enhancing the number of photocarriers in close proximity to the device contact electrodes, the number of the photocarriers drifted to the contact electrodes within a sub-picosecond timescale is increased and significantly higher quantum efficiency levels can be achieved. Further, plasmonic nanostructures can enhance the optical-to-terahertz conversion efficiency of photomixers for continuous-wave, frequency-tunable terahertz generation.

A schematic diagram of a plasmonic photomixer in comparison with an analogous photomixer based on a conventional design (i.e. having interdigitated contact electrodes) in accordance with an embodiment of the invention is illustrated in FIG. 1. As illustrated 100, the plasmonic and conventional design can be implemented on a similar photomixer 106 fabricated on a ErAs:InGaAs substrate 102 with an integrated logarithmic spiral antennas 104 connected to an optical pump 116 to emit terahertz radiation 114 as further described below. Typically, the difference in the plasmonic and convention designs can be in the contact electrode designs as illustrated in 108 and 110, respectively.

In many embodiments, the plasmonic and conventional photomixers can be fabricated on a ErAs:InGaAs substrate 102 (carrier lifetime ~0.85 ps) and integrated with identical logarithmic spiral antennas 104 as their terahertz radiating elements for comparison where the logarithmic spiral antennas are used to achieve the broadband radiation resistance and low antenna reactance values for terahertz generation with broad frequency tunability. In many embodiments, various other antennas can also be utilized in accordance with embodiments of the invention, including (but not limited to) dipole, bow-tie, log-periodic, and folded dipole antennas. Moreover, the contact electrodes of the plasmonic and conventional photomixers are designed to induce the same capacitive and resistive loading at the input port of the logarithmic spiral antennas. In many embodiments, plasmonic photomixers in accordance with embodiments of the invention can utilize plasmonic contact electrode gratings covering a 4 μm×8 μm area for both anode and cathode contact electrodes with an end-to-end spacing of 2 μm between the anode and cathode electrodes. In contrast, many conventional photomixers typically utilize 0.2 μm wide interdigitated contact electrodes with a 1.8 μm gap between the electrodes.

In various embodiments, plasmonic contact electrodes can consist of metallic gratings with 200 nm pitch, 100 nm metal width, 5/45 nm Ti/Au height, and a 250 nm thick $Si_3N_4$ anti-reflection coating. Typically, they are designed to allow coupling of more than ~70% of a transverse-magnetic (TM)-polarized optical pump in the 1550 nm wavelength range through the plasmonic contact electrodes into the ErAs:InGaAs substrate. In many embodiments, the plasmonic contact electrodes and the interdigitated contact electrodes can be patterned using electron-beam lithography and formed by metal deposition and liftoff. In several embodiments, the logarithmic spiral antennas and bias lines can be patterned using optical lithography and formed by metal deposition and liftoff. While specific plasmonic contact electrode designs are described above in regards to materials and grating specifications, various materials can be utilized including (but not limited to) gold, Ni, Pt, Ti and the geometry can vary depending on the substrate, metal type and wavelength such as (but not limited to) a pitch of 50 nm-2 μm, gap of 10 nm-700 nm and thickness of 1 nm. Although specific examples of utilizing plasmonic nanostructures for use with photomixers are discussed above with respect FIG. 1, any of a variety of plasmonic nanostructures and their use with photomixers as appropriate to the requirements of a specific application can be utilized in accordance with embodiments of the invention. Experimental results characterizing plasmonic photomixers in accordance with embodiments of the invention are further discussed below.

Characteristics of Plasmonic Photomixers

Figure 2A:
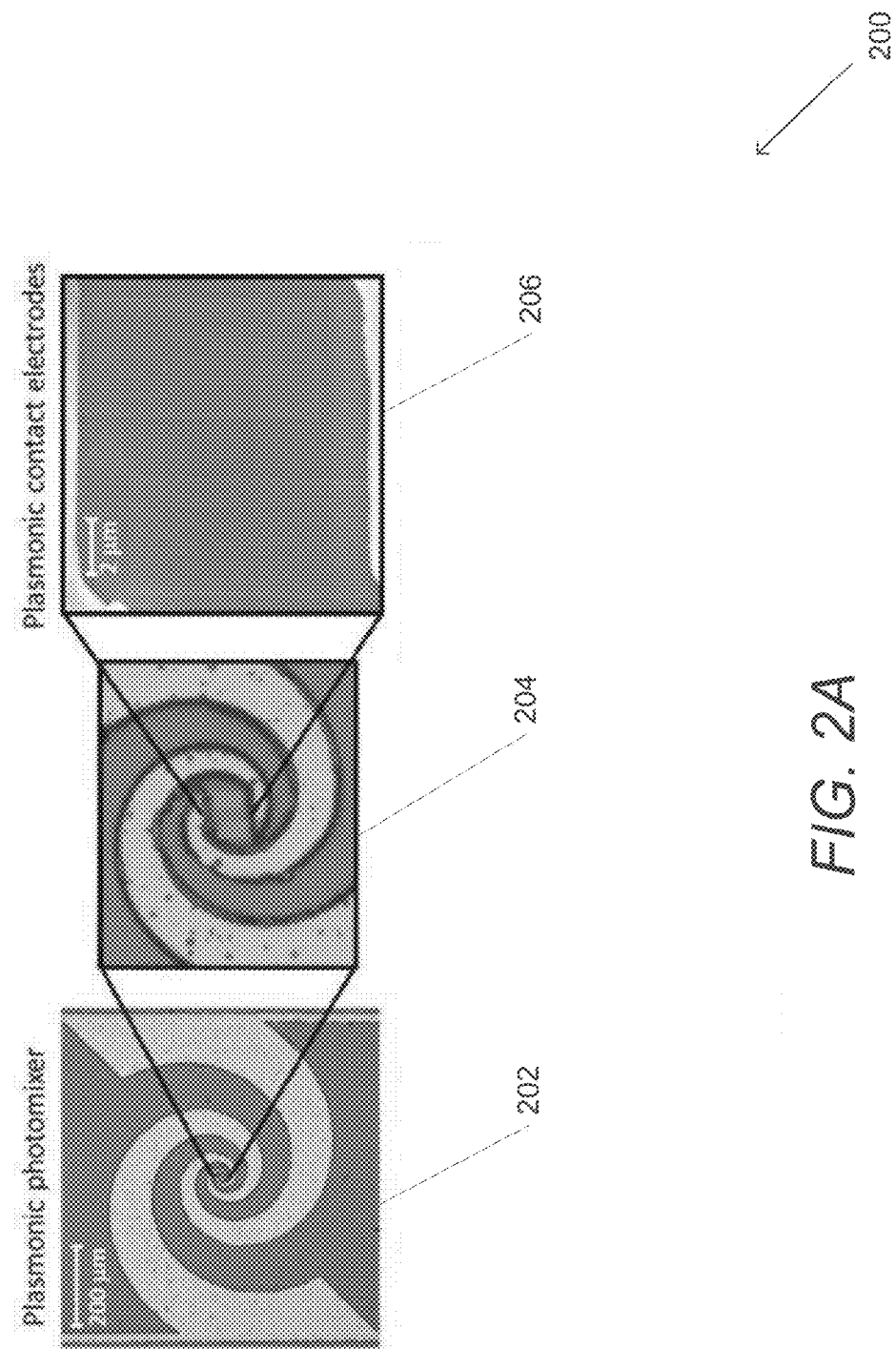
FIGS. 2A-B are microscope and scanning electron microscope (SEM) images of a plasmonic and conventional photomixers, respectively in accordance with an embodiment of the invention.
Figure 2B:
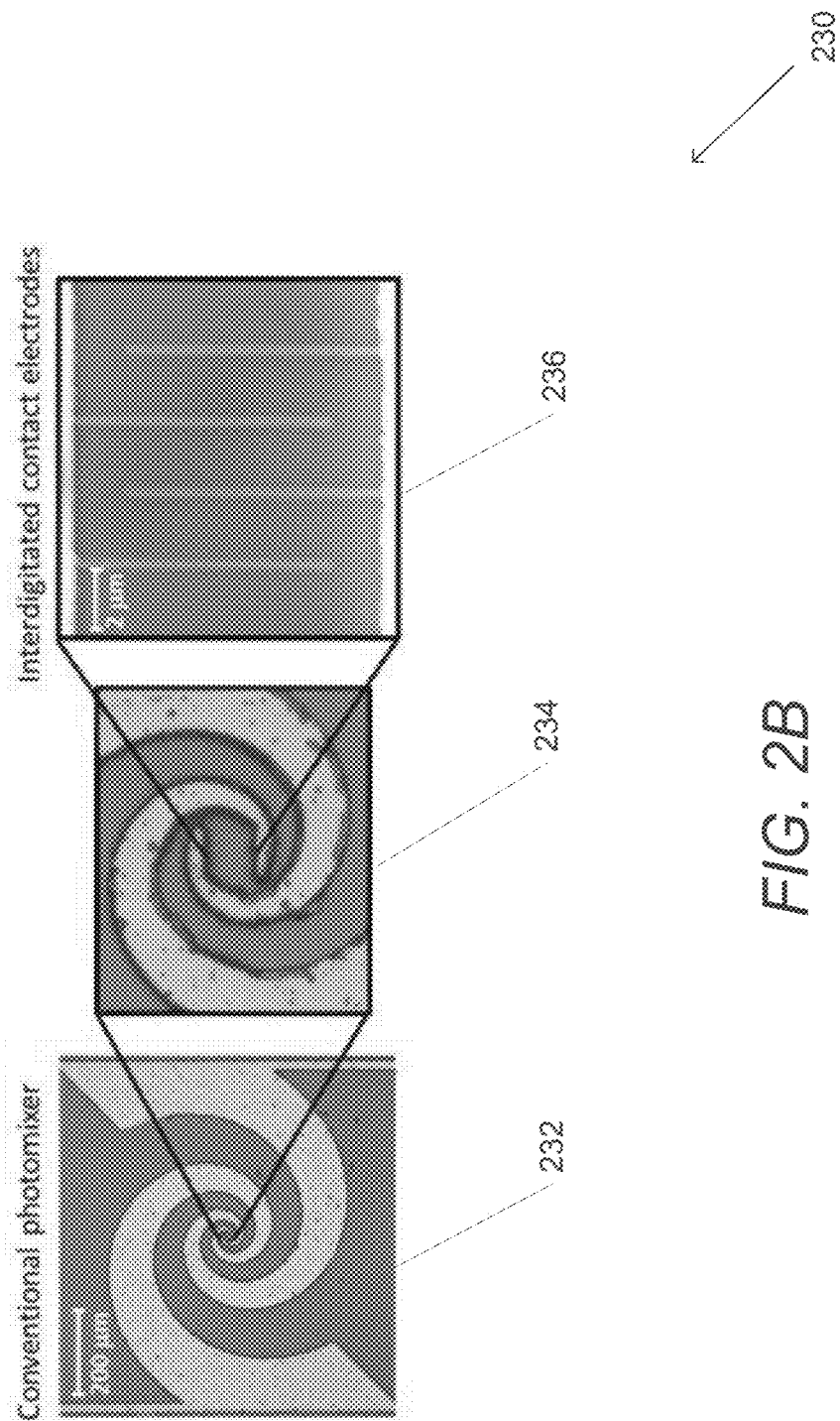

Plasmonic photomixers can be experimentally compared to conventional photomixers to highlight various characteristics of the plasmonic photomixers in accordance with embodiments of the invention. In many embodiments, fabricated plasmonic and conventional (i.e. having interdigitated contact electrodes) photomixers can be mounted in the center of two hyper-hemispherical lenses and characterized under the same experimental conditions. Microscope and SEM images focusing on the contact electrodes of plasmonic and conventional photomixers fabricated on an ErAs:InGaAs substrate in accordance with an embodiment of the invention are illustrated in FIGS. 2A-B. The set of images 200 illustrate a fabricated plasmonic photomixer with a logarithmic spiral antenna integrated with plasmonic contact electrodes. The image 202 illustrates the plasmonic photomixer at a 200 µm resolution. The image 204 is a microscope image of the plasmonic photomixer at a 20 µm resolution. Further, the image 206 is a SEM image that shows the plasmonic contact electrodes at a 2 µm resolution. The set of images 230 illustrate a fabricated conventional photomixer with a logarithmic spiral antenna integrated with interdigitated contact electrodes. The image 232 illustrates the conventional photomixer at a 200 µm resolution. The image 234 is a microscope image of the conventional photomixer at a 20 µm resolution. Finally, the image 236 is a SEM image that shows the interdigitated contact electrodes at a 2 µm resolution.

In several embodiments, the photomixers are pumped by two wavelength-tunable continuous-wave optical sources ($\Delta$~1550 nm) with the same optical power, while controlling the radiation frequency by adjusting the frequency difference between the optical sources. Additionally, in order to mitigate thermal breakdown at high optical pump powers, the optical pump is modulated with a duty cycle less than 10% as further discussed below.

Figure 2C:
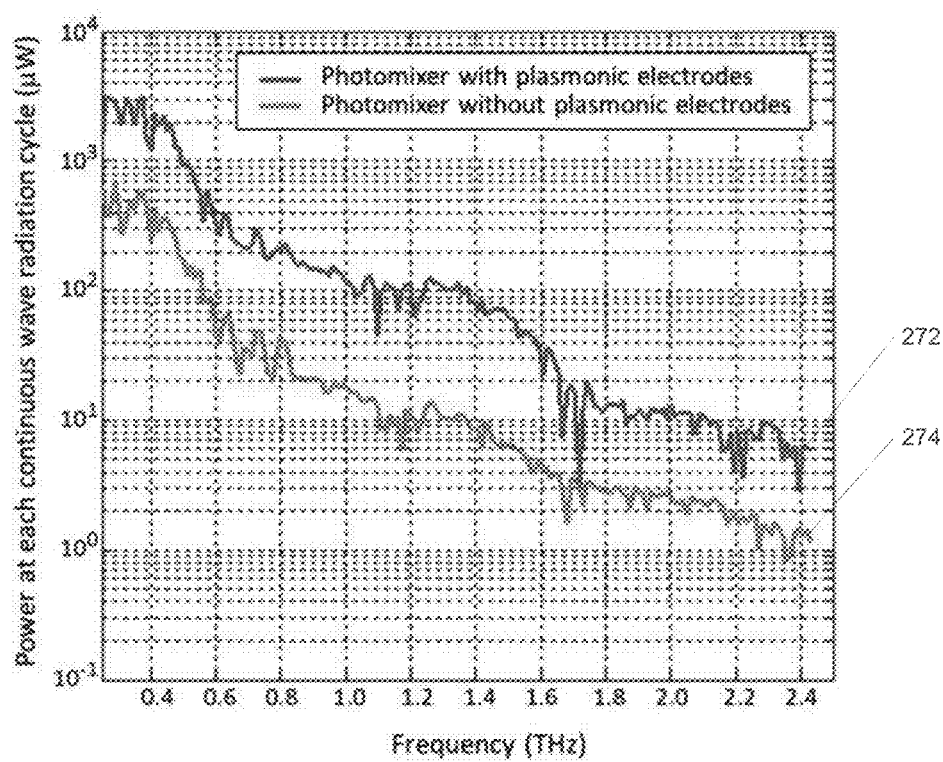
FIG. 2C is a graph illustrating radiated terahertz power within each continuous-wave radiation cycle from a photomixer with plasmonic contact electrodes in comparison with a photomixer without plasmonic contact electrodes in accordance with an embodiment of the invention.

A graph illustrating radiated terahertz power from a plasmonic photomixer within each continuous-wave radiation cycle in comparison with an analogous conventional photomixer as a function of frequency in accordance with an embodiment of the invention is illustrated in FIG. 2C. The graph 270 illustrates the power at each continuous wave radiation cycle in microwatts for a photomixer with plasmonic electrodes 272 and a photomixer with interdigitated contact electrodes 274. In this particular embodiment, a pump modulation frequency of 1 MHz, pump duty cycle of 2%, average pump power of 100 mW, and photomixer bias voltage of 3V was utilized. The results indicate an order of magnitude higher terahertz radiation power levels offered by the plasmonic photomixer over the 0.25-2.5 THz frequency range.

Figure 3A:
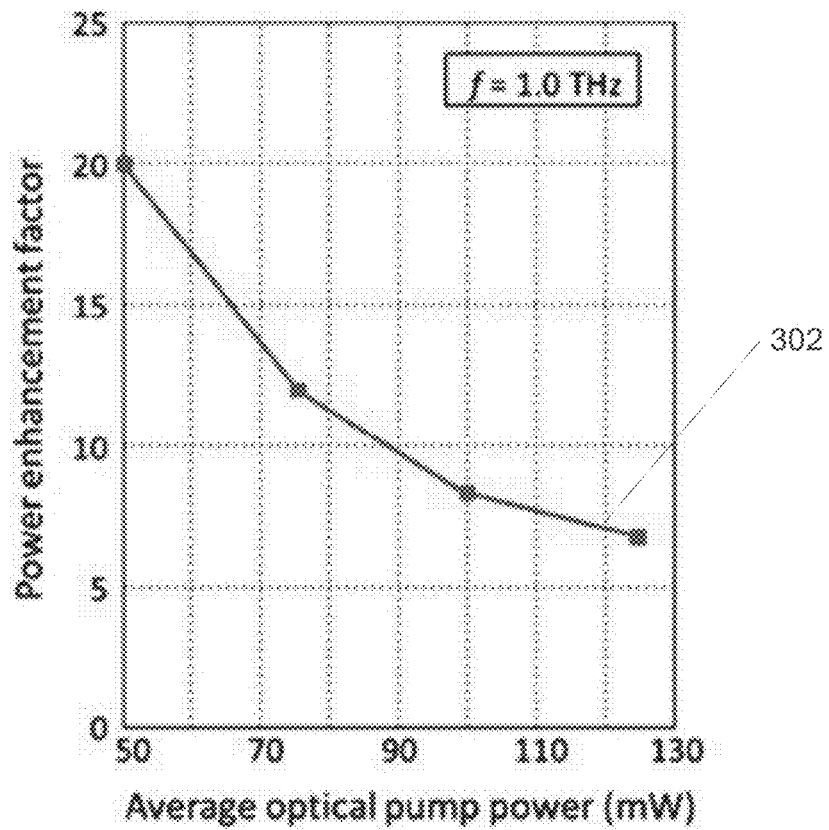
FIG. 3A is a graph illustrating the relative power enhancement factor between a plasmonic and a conventional photomixer as a function of optical pump power in accordance with an embodiment of the invention.

A relative power enhancement factor can be defined as the ratio between the radiated power from the plasmonic photomixer and the conventional photomixer. A graph illustrating power enhancement factor as a function of average optical pump power in accordance with an embodiment of the invention is illustrated in FIG. 3A. The graph 300 illustrates that higher terahertz radiation enhancement factors are achieved at lower optical pump powers 302. This is because of the carrier screening effect that impacts the plasmonic photomixer more than the conventional photomixer at high optical pump powers. In the absence of the carrier screening effect at very low optical pump power levels, two orders of magnitude higher terahertz power levels are expected from the plasmonic photomixer.

Figure 3B:
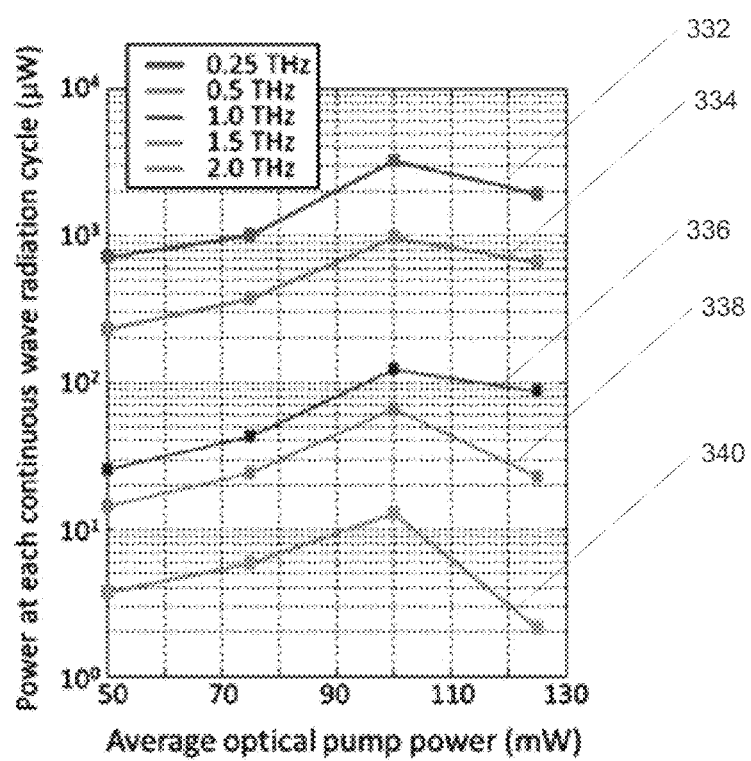
FIG. 3B is a graph illustrating radiated terahertz power within each continuous-wave radiation cycle from a plasmonic photomixer as a function of optical pump power in accordance with an embodiment of the invention.

The radiated terahertz power within each continuous-wave radiation cycle can also be analyzed as a function of the average optical pump power, for a pump duty cycle of 2% and photomixer bias voltage of 3 V as illustrated in FIG. 3B. The graph 330 includes results for radiation at 0.25 THz 332, 0.5 THz 334, 1.0 THz 336, 1.5 THz 338, and 2.0 THz 340. The results indicate a quadratic increase in the radiated terahertz power within each radiation cycle as a function of the average pump power, which slightly degrades beyond 100 mW optical pump power due to the carrier screening effect.

Figure 3C:
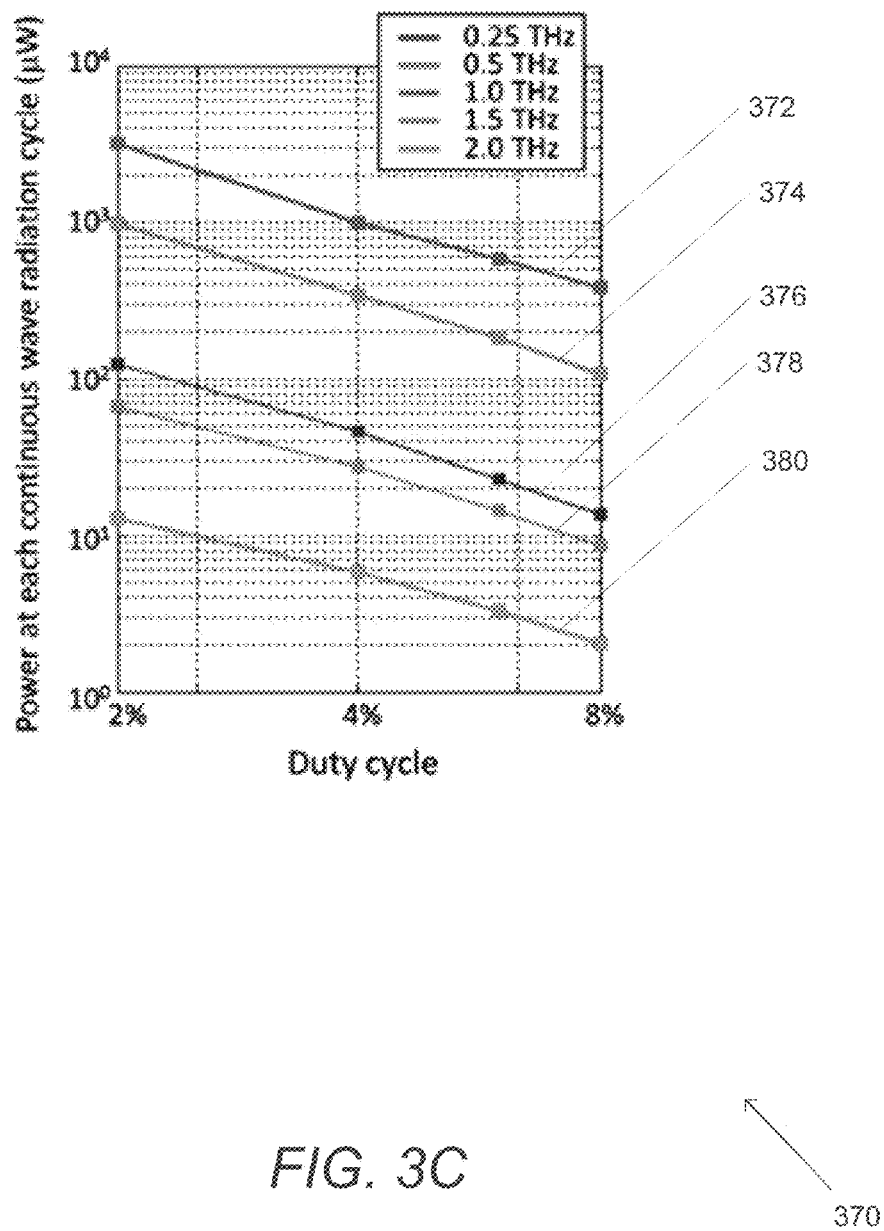
FIG. 3C is a graph illustrating radiated terahertz power within each continuous-wave radiation cycle from a plasmonic photomixer as a function of optical pump duty cycle in accordance with an embodiment of the invention.

The radiated terahertz power within each continuous-wave radiation cycle can also be analyzed in relation with the optical pump duty cycle, for an average optical pump power of 100 mW and photomixer bias voltage of 3 V as illustrated in FIG. 3C. The graph 330 includes results for radiation at 0.25 THz 372, 0.5 THz 374, 1.0 THz 376, 1.5 THz 378, and 2.0 THz 380. For this analysis, a pump modulation frequency of 1 MHz and pump duty cycles of 2%, 4%, 6%, and 8% are used, generating terahertz waves over 20, 40, 60, and 80 ns radiation cycles, respectively. As illustrated, reducing the optical pump duty cycle enables radiating higher terahertz power levels within each continuous-wave radiation cycle, while broadening the spectral linewidth of the radiated wave.

Although specific characteristics of plasmonic photomixers are described above with respect to FIGS. 2-3C, a variety of characteristics of plasmonic photomixers as appropriate to the requirements of a specific application can be obtained and analyzed in accordance with embodiments of the invention. Thermal breakdown considerations in designing plasmonic photomixers in accordance with embodiments of the invention are further discussed below.

Thermal Breakdown Considerations

A challenge toward developing high-performance photomixers operating at telecommunication pump wavelengths can be the high conductivity nature of photo-absorbing semiconductors in this wavelength range (e.g. InGaAs). This is because efficient acceleration of photocarriers inside high conductivity substrates may call for sufficient biasing accompanied by high dark current levels, which could lead to thermal breakdown especially at relatively high pump power levels.

In addition to the use of plasmonic contact electrodes as discussed above, the optical pump can be modulated with a duty cycle below 50% in order to achieve high terahertz radiation power levels. In various embodiments, the duty cycle is below 10%. The low-duty-cycle allows for increasing the optical pump power within each CW radiation cycle, while pushing the thermal breakdown onset to higher optical pump powers. In many embodiments of the invention, at an average optical pump power of 150 mW with a pump modulation frequency of 1 MHz and pump duty cycle of 2%, results demonstrate up to 0.8 mW radiation power at 1 THz, within each CW radiation cycle as further discussed below.

Figure 4:
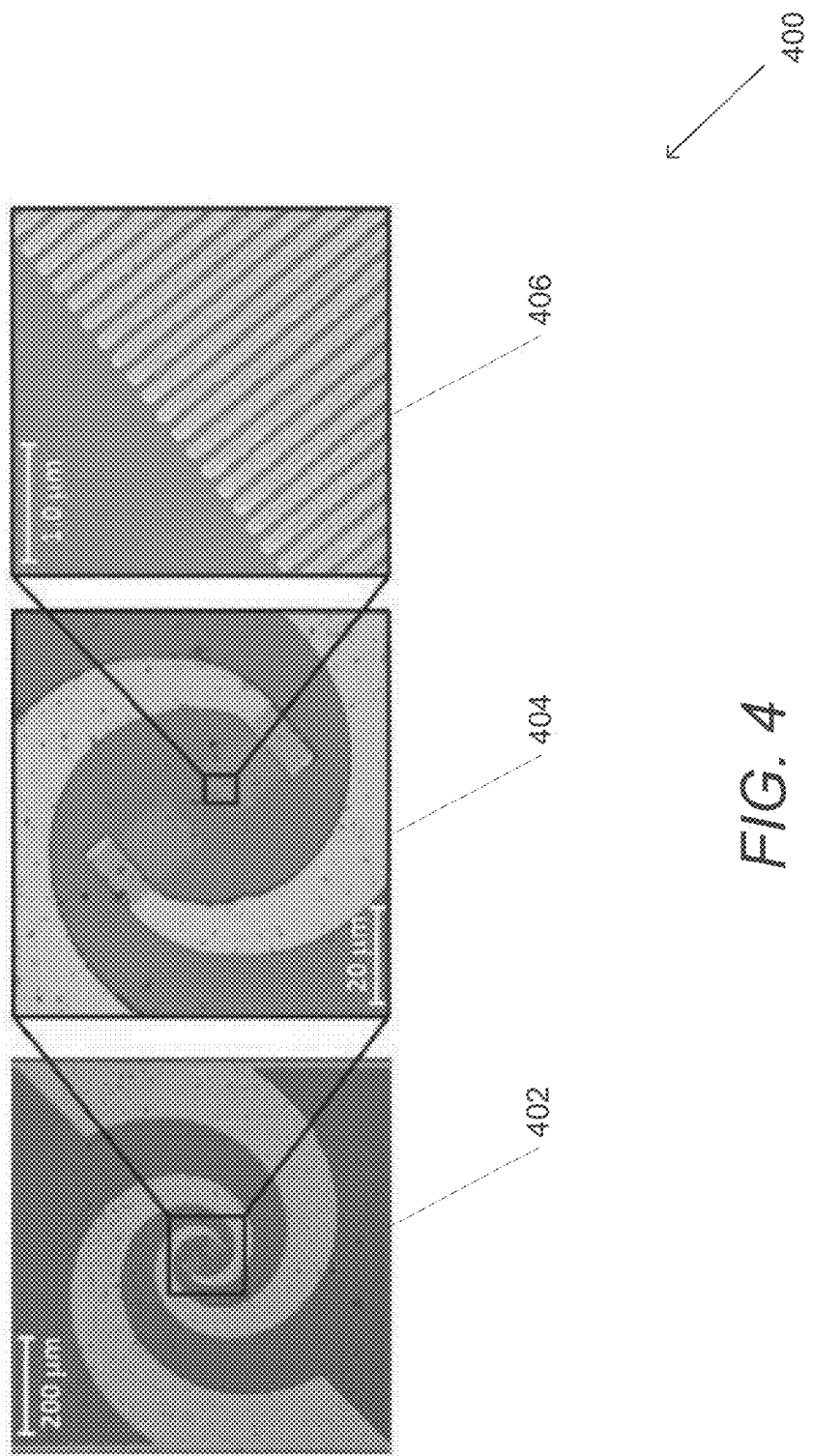
FIG. 4 is a microscope and SEM images of a fabricated plasmonic photomixer with a logarithmic spiral antenna integrated with plasmonic contact electrodes in accordance with an embodiment of the invention.

A microscope image of a plasmonic photomixer fabricated on an ErAs:InGaAs substrate, with a carrier lifetime of ~0.85 ps, in accordance with an embodiment of the invention is illustrated in FIG. 4A. The set of images 400 illustrate the fabricated plasmonic photomixer with plasmonic contact electrodes. The image 402 illustrates the plasmonic photomixer at a 200 µm resolution. The image 404 is a microscope image of the plasmonic photomixer at a 20 µm resolution. Further, the image 406 is a SEM image that shows the plasmonic contact electrodes at a 2 µm resolution. Again, a logarithmic spiral antenna is used as the terahertz radiating element to achieve a broad radiation frequency range. The logarithmic spiral antenna can be designed to offer a broadband radiation resistance of 70-100Ω while maintaining a reactance value near 0Ω over the 0.1-2.5 THz frequency range. Each contact electrode of the plasmonic photomixer can be a plasmonic grating covering a 15×15 µm² area, with 200 nm pitch, 100 nm metal width, 5/45 nm Ti/Au height, and a 250 nm thick $Si_3N_4$ anti-reflection coating. In many embodiments, the plasmonic contact electrodes are designed to maximize device quantum efficiency at optical pump wavelength of 1550 nm. In various embodiments, the end-to-end spacing between the anode and cathode contact electrodes is set to 10 μm to maintain the highest photocarrier drift velocity across the entire 15×15 μm² plasmonic contact electrode area.

In several embodiments, the fabrication process starts with patterning plasmonic contact electrode gratings using electron-beam lithography followed by deposition of Ti/Au (5/45 nm) and liftoff. A 250 nm $Si_3N_4$ anti-reflection coating is then deposited using plasma-enhanced chemical vapor deposition. Next, contact vias can be patterned using optical lithography and formed using dry plasma etching. Finally, the logarithmic spiral antennas and bias lines can be patterned using optical lithography, followed by deposition of Ti/Au (10/400 nm) and liftoff.

As discussed above, the fabricated plasmonic photomixers are then mounted on a hyper-hemispherical silicon lens and characterized using two frequency-offset pump lasers in the 1550 nm wavelength range. In order to mitigate thermal breakdown, which can be the ultimate limit for device failure at high optical pump powers, the optical pump is modulated with a duty cycle below 10%. Using short optical pump duty cycles allows increasing the optical pump power within each CW radiation cycle, while pushing the thermal breakdown onset to higher optical pump powers. In many embodiments, the CW optical beam from the wavelength-tunable optical sources can be modulated at 1 MHz and then amplified using a pulsed fiber amplifier. As discussed further below, the photomixers are characterized at 2%, 4%, 6%, and 8% pump duty cycles, generating terahertz waves over 20, 40, 60, and 80 ns CW radiation cycles, respectively.

Experimental Setup and Low Duty Cycles

Figure 5:
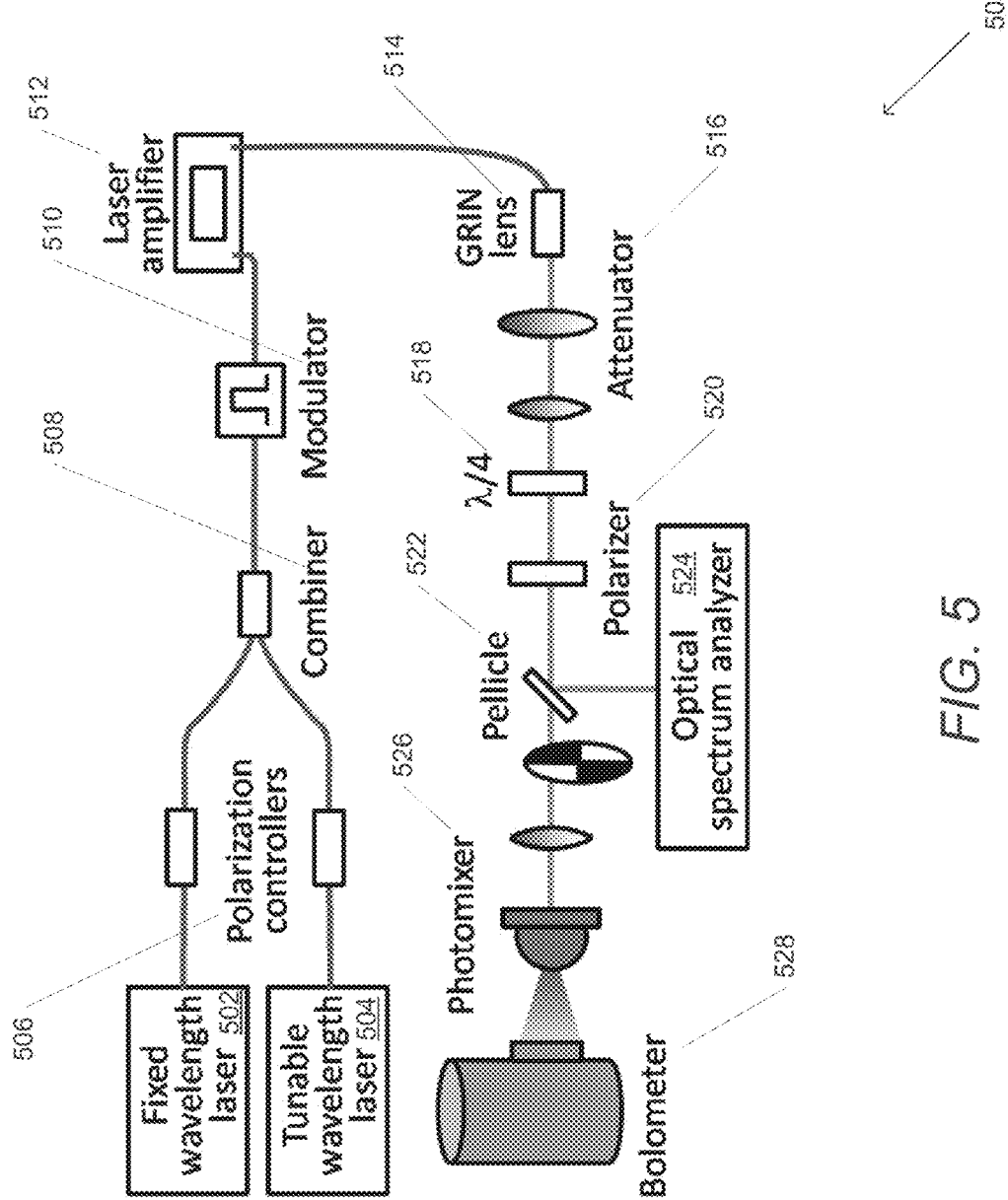
FIG. 5 illustrates an experimental setup for characterizing plasmonic photomixers in accordance with an embodiment of the invention.

An experimental setup used for characterizing the plasmonic photomixers in accordance with an embodiment of the invention is illustrated in FIG. 5. The experimental setup 500 can consist of two fiber-coupled CW lasers, one 502 with a fixed wavelength at 1545.4 nm (such as but not limited to QPhotonics QDFBLD-1550-10) and the other one 504 with a tunable wavelength (such as but not limited to Santec TSL-510) connected to polarization controllers 506. The output of the two lasers can be combined in a 2:1 fiber combiner 508 and modulated by an acousto-optic modulator 508 (such as but not limited to NEOS Technologies 15200-.2-1.55-LTD-GaP-FO). The pulsed laser beam is then amplified using a pulse amplifier 512 (such as but not limited to Optilab APEDFA-C-10) and focused onto the plasmonic photomixer 526 utilizing a grade index (GRIN) lens 514 and attenuator 516. For optimal photomixing efficiency, the incident light from two laser sources should be linearly polarized with equal power levels. For this purpose, a quarter waveplate 518 can be used to convert the polarization of the laser light to circular polarization and convert it back to a linear polarization using a linear polarizer 520. In order to adjust the two laser beams to have equal power levels, a pellicle 522 can be used to separate a ~8% of the laser beam to be monitored by an optical spectrum analyzer 524. Finally, the generated terahertz radiation can be measured via a silicon bolometer 528, while tuning the wavelength of the tunable laser.

Figure 6A:
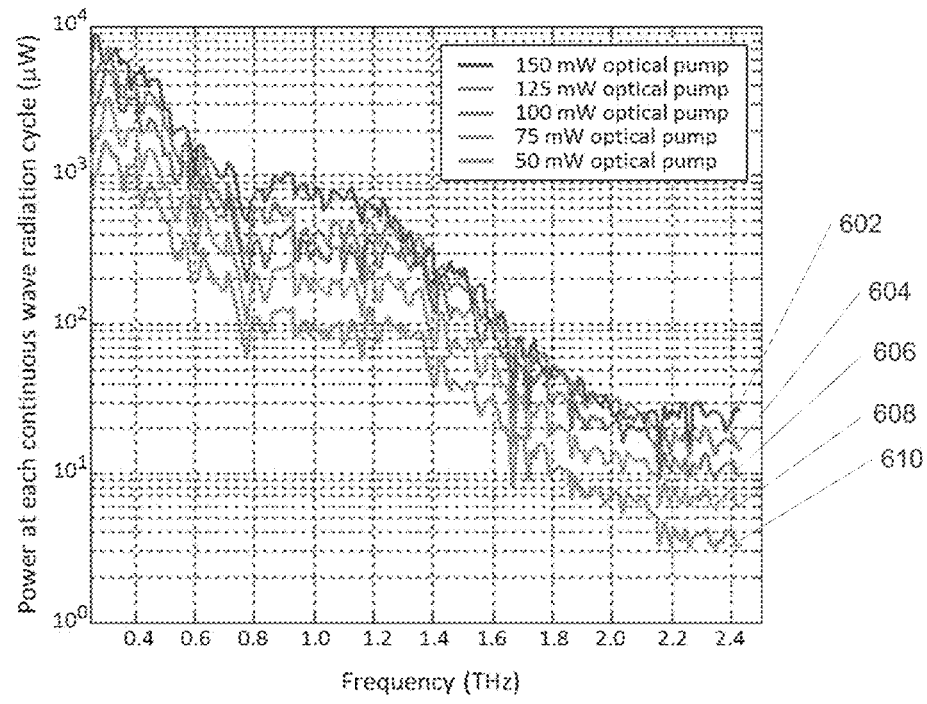
FIG. 6A is a graph illustrating radiated terahertz power from a plasmonic photomixer as a function of frequency in accordance with an embodiment of the invention.
Figure 6B:
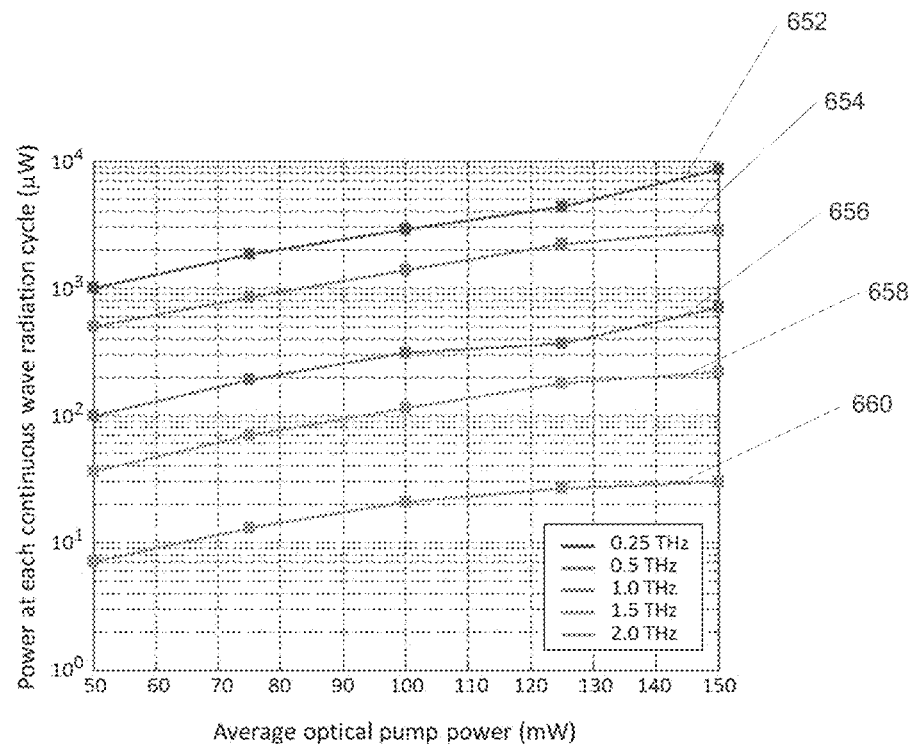
FIG. 6B is a graph illustrating radiated terahertz power from a plasmonic photomixer as a function of average optical pump power in accordance with an embodiment of the invention.

Plasmonic photomixers can be characterized and analyzed in consideration of pump duty cycles. The radiated terahertz power within each CW radiation cycle as a function of the average optical pump power, for a radiation duty cycle of 2% and photomixer bias voltage of 10 V is illustrated in FIG. 6A. The graph 600 illustrates results for optical pump powers of 150 mW 602, 125 mW 604, 100 mW 606, 75 mW 608, and 50 mW 610. In addition, the radiated terahertz power within each CW radiation cycle can increase quadratically as a function of the average pump power as illustrated in FIG. 6B. The graph 650 illustrates results for radiation of 0.25 THz 652, 0.5 THz 654, 1.0 THz 656, 1.5 THz 658, and 2.0 THz 660. In many embodiments, at an average optical pump power of 150 mW, terahertz radiation powers as high as 0.8 mW can be achieved at 1 THz over 20 ns CW radiation cycles, corresponding to a spectral linewidth broadening of 50 MHz.

Figure 7A:
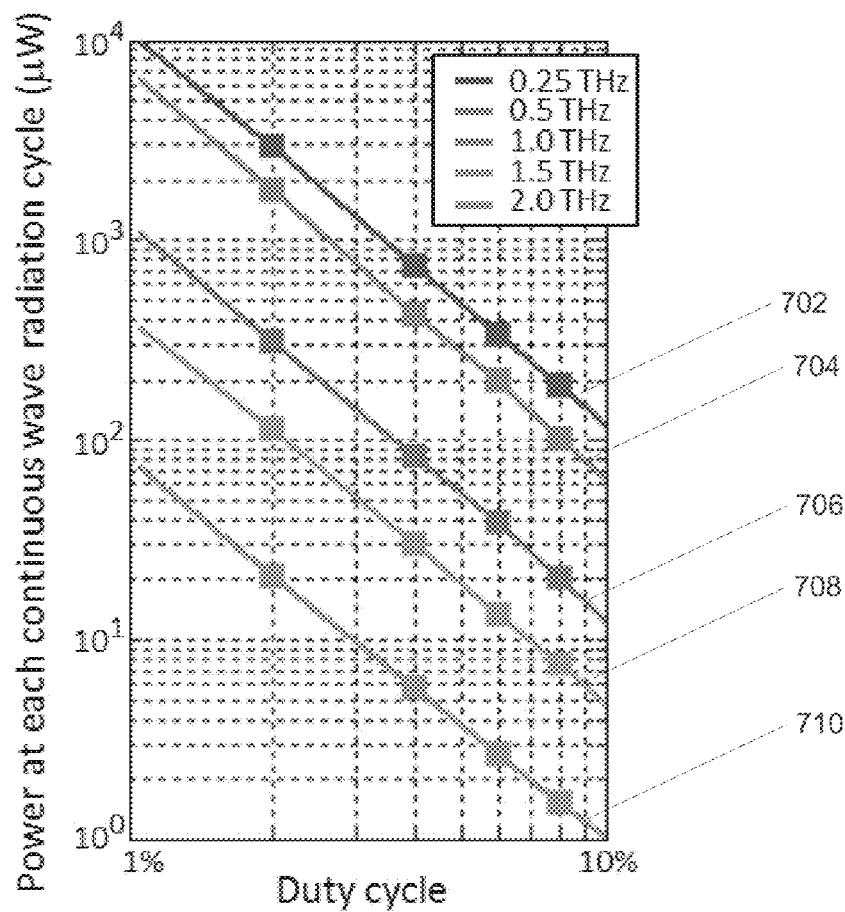
FIG. 7A is a graph illustrating radiated terahertz power from a plasmonic photomixer as a function of pump duty cycle in accordance with an embodiment of the invention.
Figure 7B:
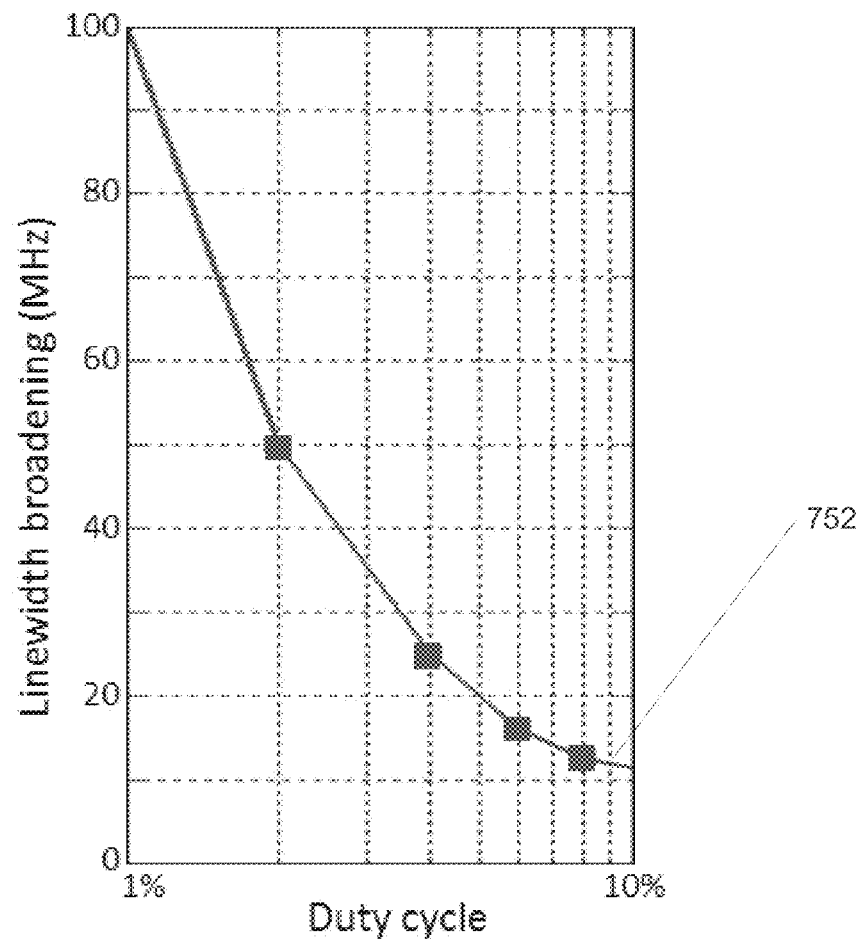
FIG. 7B is a graph illustrating an estimated spectral broadening of the radiated terahertz wave from the plasmonic photomixer as a function of pump duty cycle in accordance with an embodiment of the invention.

The tradeoff between the radiated terahertz power and spectral linewidth as a function of the pump duty cycle is illustrated in FIG. 7A. The graph 700 illustrates results for radiation of 0.25 THz 702, 0.5 THz 704, 1.0 THz 706, 1.5 THz 708, and 2.0 THz 710. In several embodiments, the terahertz power measurements are taken at an average optical pump power of 100 mW and a pump modulation frequency of 1 MHz. At the optical pump duty cycles of 2%, 4%, 6%, and 8%, radiation power levels as high as 300 μW, 75 μW, 35 μW, and 20 μW are measured at 1 THz over 20, 40, 60, and 80 ns CW radiation cycles, corresponding to 50, 25, 16, and 12.5 MHz linewidth broadening, respectively as further illustrated in FIG. 7B. The radiation linewidth broadening is estimated using the Fourier theory. The graph 750 illustrates that the use of shorter optical pump duty cycles allows increasing the optical pump power within each CW radiation cycle, while pushing the thermal breakdown onset to higher optical pump powers 752. Since the terahertz radiation power from the photomixer has a quadratic relation with the optical pump power, reducing the optical pump duty cycle dramatically increases the optical-to-terahertz conversion efficiency and the maximum radiated power from a photomixer before thermal breakdown. In the meantime, use of shorter CW radiation cycles results in broader radiation linewidths. Therefore, the duty cycle and repetition rate of the optical pump should be carefully selected to satisfy the spectral linewidth requirements of the specific application the photomixer is used for. In this regard, reducing the pump modulation frequency in our measurements would reduce the radiation linewidth while offering the same terahertz radiation power levels at a given optical pump duty cycle.

Although experimental setups and duty cycles are described above with respect to FIGS. 5-7B, a variety of experimental setups and duty cycles as appropriate to the requirements of a specific application can be utilized in accordance with embodiments of the invention. Further, although specific radiated terahertz frequency ranges and specific tunability of frequency ranges are discussed above in regards to the use of low-duty-cycles, systems and methods in accordance to embodiments of the invention can utilize any radiated frequency range and even non-tunable radiation in applying low-duty-cycles in accordance with embodiments of the invention.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A photomixing system configured to generate continuous-wave terahertz frequency signals comprising:

an optical pump configured to:
   generate at least two beams, where the at least two beams are utilized to create a frequency-offset; and
   operate below a 50% duty cycle, where the duty cycle includes an operation cycle and a sleep cycle, wherein the optical pump operates with an average optical pump power of less than or equal to 150 mW; and
a photomixer comprising a radiating element configured to receive the frequency-offset and to generate a terahertz radiation utilizing the received frequency-offset and the radiating element, wherein the radiating element includes at least one plasmonic contact electrode.

2. The photomixing system of claim 1, wherein the radiating element is an antenna capable of broadband radiation.

3. The photomixing system of claim 2, wherein the radiating element is selected from the group consisting of a logarithmic spiral antenna, a dipole antenna, a bow-tie antenna, a log-periodic antenna, and a folded dipole antenna.

4. The photomixing system of claim 1, wherein the photomixer is fabricated on a substrate that is capable of absorbing photons in the optical pump's operating wavelength range.

5. The photomixing system of claim 4, wherein the photomixer is fabricated on an ErAs compound substrate.

6. The photomixing system of claim 4, wherein the photomixer is fabricated on an InGaAs compound substrate.

7. The photomixing system of claim 4, wherein the photomixer is fabricated on a substrate selected from the group consisting of GaAs, InGaAs, Ge, InP, Graphene, and GaN substrates.

8. The photomixing system of claim 1, wherein the generated terahertz radiation has a 0.25-2.5 THz frequency range.

9. The photomixing system of claim 1, wherein the generated terahertz radiation has a frequency range greater than 2.5 THz.

10. The photomixing system of claim 1, wherein the generated terahertz radiation has a frequency range less than 0.25 THz.

11. The photomixing system of claim 1, wherein the generated terahertz radiation is frequency-tunable.

12. The photomixing system of claim 1, wherein the generated terahertz radiation is a non-tunable radiation.

13. A method for generating continuous-wave terahertz frequency signals using a photomixing system comprising:
   generating at least two beams using an optical pump, where the at least two beams are utilized to create a frequency-offset; operating the optical pump below a 50% duty cycle, where the duty cycle includes an operation cycle and a sleep cycle, wherein the optical pump operates with an average optical pump power of less than or equal to 150 mW;
   receiving the frequency-offset using a photomixer, where the photomixer comprises a radiating element, wherein the radiating element includes at least one plasmonic contact electrode; and
   generating a terahertz radiation based upon the received frequency-offset and the radiating element.

14. The method of claim 13, wherein the radiating element is an antenna capable of broadband radiation.

15. The method of claim 14, wherein the radiating element is selected from the group consisting of a logarithmic spiral antenna, a dipole antenna, a bow-tie antenna, a log-periodic antenna, and a folded dipole antenna.

16. The method of claim 13, wherein the photomixer is fabricated on a substrate that is capable of absorbing photons in the optical pump's operating wavelength range.

17. The method of claim 16, wherein the photomixer is fabricated on an ErAs compound substrate.

18. The method of claim 16, wherein the photomixer is fabricated on an InGaAs compound substrate.

19. The method of system of claim 16, wherein the photomixer is fabricated on a substrate selected from the group consisting of GaAs, InGaAs, Ge, InP, Graphene, and GaN substrates.

20. The method of claim 13, wherein the generated terahertz radiation has a 0.25-2.5 THz frequency range.

21. The method of claim 13, wherein the generated terahertz radiation has a frequency range greater than 2.5 THz.

22. The method of claim 13, wherein the generated terahertz radiation has a frequency range less than 0.25 THz.

23. The method of claim 13, wherein the generated terahertz radiation is frequency-tunable.

24. The method of claim 13, wherein the generated terahertz radiation is a non-tunable radiation.

* * * * *